March 16, 1954

R. T. SHEEN 2,672,405

TITRATION SYSTEM

Filed July 13, 1950

INVENTOR
Robert T. Sheen
BY
ATTORNEYS.

March 16, 1954     R. T. SHEEN     2,672,405
TITRATION SYSTEM

Filed July 13, 1950                         4 Sheets-Sheet 2

INVENTOR
Robert T. Sheen
BY
ATTORNEYS.

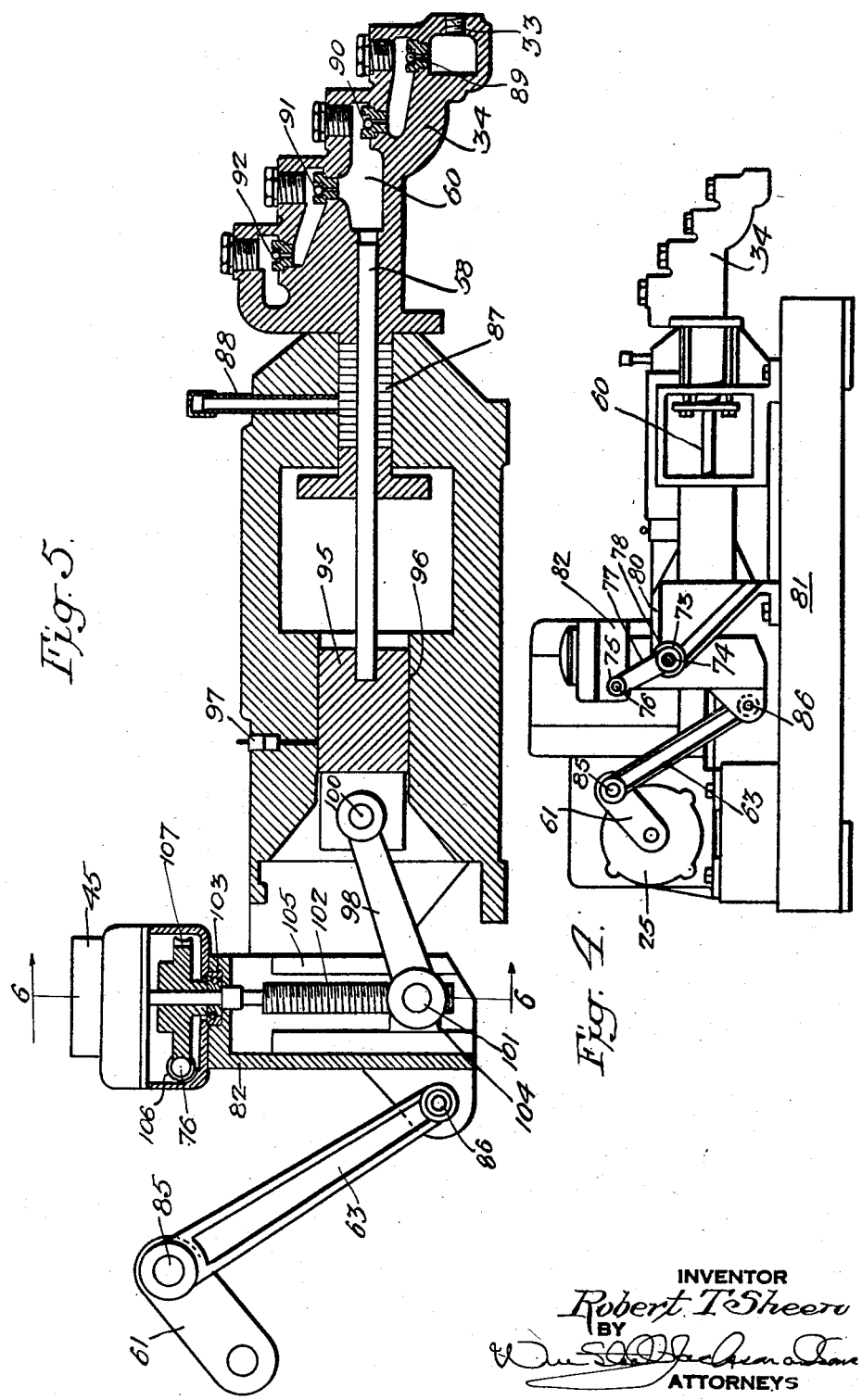

INVENTOR
Robert T. Sheen
BY
ATTORNEYS

Patented Mar. 16, 1954

2,672,405

UNITED STATES PATENT OFFICE 2,672,405

TITRATION SYSTEM

Robert T. Sheen, Somerville, N. J., assignor to Milton Roy Company, Chestnut Hill, Pa., a corporation of Pennsylvania Application July 13, 1950, Serial No. 173,650

5 Claims. (Cl. 23—253)

The present invention relates to chemical titration systems of the character which may be employed to indicate the result of a titration and desirably also to control the concentration of a main body of liquid.

The solution whose concentration is being indicated or controlled is herein called the main solution. The additive to the main solution is called the main reagent and is normally a concentration form of the ingredient whose concentration is being controlled. The solution which titrates a partial sample of the main solution is herein called the sample reagent.

A purpose of the invention is to simplify the mechanism required for titrating a main solution, to obtain increased accuracy in the titration and desirably also in the control of the main solution, and to simplify the indication (as well as the recording) of the data obtained.

A further purpose is to facilitate and simplify the indication and control of chemical concentrations in strong solutions in which the direct measurement of concentration is difficult.

A further purpose is to withdraw a fractional metered sample from a main solution through one side of a duplex pump having a common drive, to titrate such fractional sample to a constant end point by a sample reagent supplied through the other side of the duplex pump, the end point being one at which the concentration can be accurately measured by virtue of lowering of the concentration of the solution, and to control the pumping of the sample reagent in accordance with an electrical property of the reaction mixture to maintain the end point constant.

A further purpose is to control the introduction of main reagent into the main solution in accordance with the variation of the discharge of the pump for the sample reagent from a predetermined value.

A further purpose is to operate the pump units of the duplex pump for the fractional sample and for the sample reagent in phase with one another.

A further purpose is to vary the stroke of the pump unit for the sample reagent and indicate (and preferably also record) the changes in stroke.

A further purpose is to employ the principles of the invention in the titration of acidimetry main liquids, main liquids which are subject to dilution for control of concentration, and oxidation potential main liquids.

Further purposes appear in the specification and in the claims.

In the drawings I have chosen to illustrate a few only of the embodiments in which my invention may appear, choosing the forms shown from the standpoints of convenience in illustration, satisfactory operation and clear demonstration of the principles involved.

Figure 4 is a section of Figure 1 on the line 4—4 to enlarged scale.

Figure 5 is a section of Figure 1 on the line 5—5 to still further enlarged scale.

Figure 1:
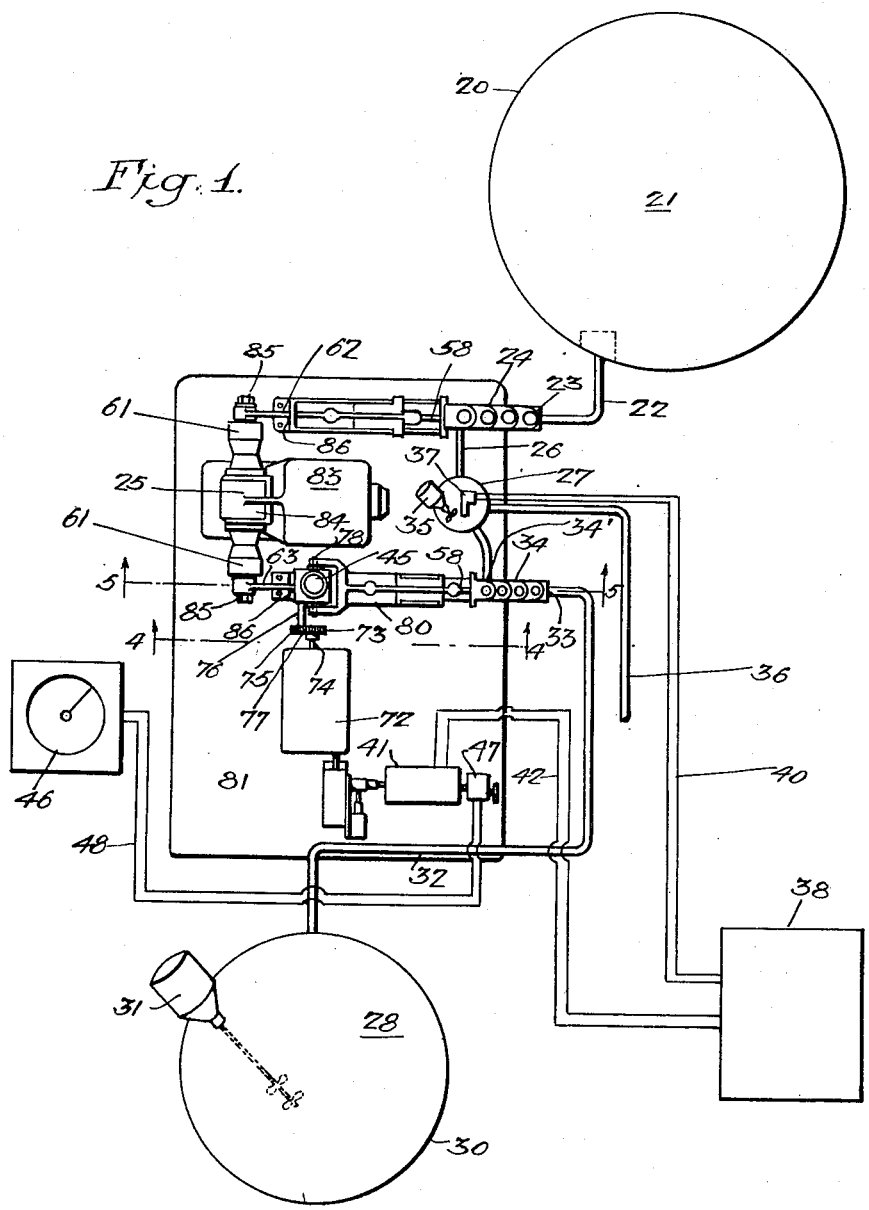
Figure 1 is a diagrammatic illustration of a titration system comprising the invention.
Figure 1A:
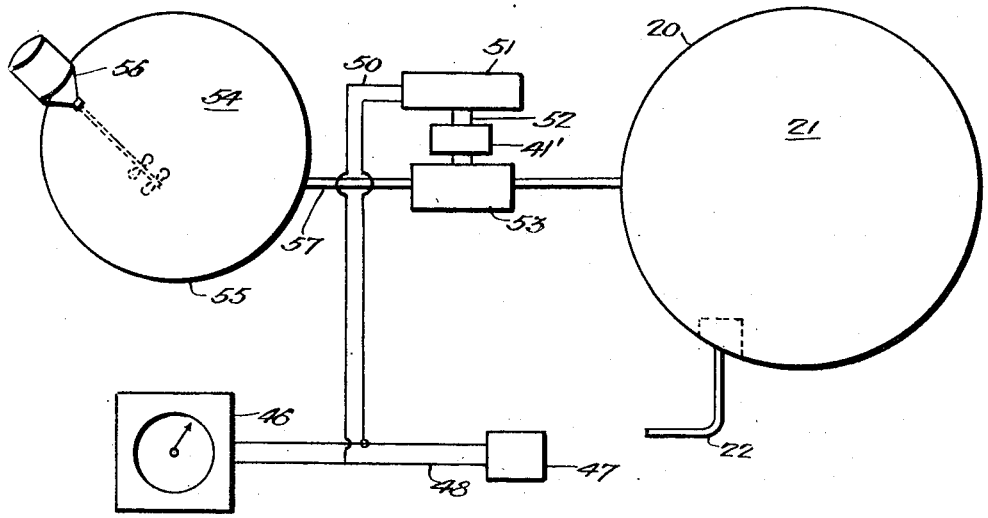
Figure 1a is a diagrammatic fragmentary view showing a variation in the equipment of Figure 1, applied to the equipment of Figure 1, and omitting equipment in Figure 1 which is unchanged.

Related subject matter in which the end point is variable is contained in my application Serial No. 15,431, filed March 17, 1948, for Automatic Titration System, relating to process, and Serial No. 101,106, filed June 24, 1949, for Automatic Titration System, relating to the apparatus. The present application is a division of application Serial No. 101,105, filed June 24, 1949, for Titration System.

In the prior art considerable difficulty has been encountered in controlling the chemical concentrations of strong solutions due to the fact that control sensing elements are difficult to apply accurately to such solutions and are likely to be inaccurate. It has been proposed that a partial sample be withdrawn from a main solution through a variable head orifice device and a constant head orifice device and a sample reactant be added to bring the hydrogen ion concentration into a range which can be accurately measured and then the required amount of acid or alkali be added to the main solution to create the desired concentration (Smith 1,684,645). In this case the amount of sample reagent added is invariable and the end point varies over a wide range.

Where the end point is thus varying it is difficult for the user to obtain an indication or record which provides convincing evidence that constant conditions are being maintained by the apparatus, and if any such evidence is required the mechanism needed to obtain this result is very complicated.

It is also decidedly less accurate to determine the end point over a widely variable range than to determine the end point at a constant level, since the wider the range the greater the variation in indication by the sensing element, notwithstanding that an effort may be made to titrate at a portion of the titration curve at which this effect is minimized.

In accordance with the present invention, the end point is constant and simple readily-obtainable indicators and recorders can be used to show that constant conditions are being maintained, thus enabling the operator to determine very readily whether or not his process is in control and the tolerance of such control.

Since the present invention employs a constant end point, great accuracy in the sensing of the end point can be obtained notwithstanding that the conditions of the process produce wide variations in concentration of the main liquid being titrated.

Thus it is possible to obtain great accuracy in the titration of liquids which have such a wide concentration variation that the range of variation would normally include points on the titration curve which are unfavorable to accurate indication by the particular sensing element. The point of greatest accuracy of the sensing element can be selected as the end point without reference to the concentration of the main liquid.

Accordingly by the present invention increased accuracy is secured, with minimum expenditure for apparatus.

In accordance with the present invention, a partial sample is withdrawn continuously from the main body of the liquid whose concentration is being indicated or controlled, the partial sample is continuously titrated by a sample reactant, an electrical property of the reaction mixture is continuously determined by a sensing element, and the quantity of sample reactant to produce a constant end point is controlled by the sensing element. Both the partial sample and the sample reactant are very desirably introduced through opposite sides of a duplex pump having a common drive, the side of the pump carrying the sample reactant being controlled as to discharge and preferably as to stroke by the sensing element.

The variation in stroke of the pump unit for the sample reactant can be indicated or recorded. In addition the introduction of main reagent into the main body of liquid is desirably controlled according to the variation in the stroke of the pump unit for the sample reactant from a predetermined value corresponding to the correct concentration in the main solution.

To assure accuracy in titration, both pump units are desirably synchronized so that the suction and discharge strokes will coincide. This avoids any tendency of the titration to hunt. The titration chamber for the reaction mixture will preferably have a capacity exceeding one minute's pumping capacity of the duplex pump, so that the increments of change will be small.

The principles of the invention are applicable to concentrations of various characters, such as acidimetry (and of course alkalimetry), control based on ion concentration such as conductivity, control based on oxidation potential or the like. The character of the sample reactant and the main reactant will depend on what concentration is being controlled; for example in the case of acid the main reactant may be an acidimetry reactant of the proper concentration, or a diluent, while in the case of oxidation potential characteristics the sample reactant will be a reducing agent if the main liquid is an oxidizing agent, and an oxidizing agent if the main liquid is a reducing agent.

Likewise, a color reactant may be employed, sensed by a photometer or colorimeter.

Referring to Figure 1, a container 20 is shown for the main body of liquid which is being titrated. This may be of any suitable shape, whether that of a treating vessel as indicated, or that of a conduit or pipe. It will of course be understood that make-up water can be introduced independently to hold volume or level in the container 20 if desired.

The main body of liquid may be employed for processing or any other purpose, and its concentration may be subject to variation due to chemical reaction, "drag out," or for any other reason.

In order to accomplish titration of the main body of liquid, a fractional sample or partial sample of the main body of liquid 21 is withdrawn through a pipe 22 into the inlet 23 of a metering pump 24, driven by a common drive 25, and feeding through a pipe 26 to a titrating chamber 27. Thus a continuous sample is obtained, which in quantity will suitably be a minute proportion of the main body of liquid 21, but in any case will be representative of or will bear an established relation to the main body of liquid. While the metered feed from the pump 24 will preferably be made adjustable to permit change when titrating a new main liquid, the sample will be withdrawn at a rate which is suitably invariable.

In order to titrate the sample, sample reagent 28 in solution or other liquid form from a container 30 provided with a stirrer 31 is supplied by a pipe 32 to the inlet 33 of a metering device, suitably a metering pump 34, having a variable discharge as later explained. The outlet 34' connects with the titration chamber 27. The pump 34 should desirably be driven by the common drive 25 so that variations which might result from the change in behavior of the drive of either pump will equally affect both pumps and will not cause inaccuracy in the rate of feed of the partial sample and sample reagent. Thus the pumps 24 and 34 each are units of a duplex pump. The titration chamber 27 is desirably provided with a stirrer 35, and the reaction mixture from the titration chamber 27 is suitably discharged as by an overflow pipe 36, the discharge being wasted or recovered as desired, but normally not returned to the main body of liquid 21. The level of overflow or the overflow resistance in the pipe 36 will be set to assure adequate pressure differential across pump units 24 and 34 to assure metering action by these pumps.

A sensing element 37 of suitable character is in contact with the reaction mixture in the titration chamber, and will be of any well known type which responds to the particular characteristic which is being controlled. It will normally be of a character which undergoes a change in electrical properties with change in titrating conditions, the change in electrical properties normally being current or voltage. For example, if hydrogen ion concentration is being controlled, a hydrogen ion sensing element of any well known type, such as a glass electrode, may be used. If total ion concentration is being controlled, a conductivity sensing element of well known character will be employed. If oxidation potential is being indicated, a sensing element for oxidation potential of well known character may be used. The sensing element may also sense by color, viscosity or specific gravity as well known. Similarly if the concentration of any particular ion is being controlled, a sensing element responding to the concentration of that ion will be employed.

The sensing element is connected to a controller 38 of well known character, conventional wiring 40 being used to transmit the electrical property to the controller. The controller on its output side makes controlling connections with a stroke varying motor 41 for the pump unit 34, as through electrical wiring 42.

Controllers of this character are available on the market from various sources and their detail forms no part of the present invention. Besides controlling the stroke of the pump 34, the controller 38 provides an indication and plots a chart showing the constancy of the end point. The controller operates continuously to maintain the end point constant in the titration chamber 27, constantly varying the discharge of the sample reagent pump 34 for this purpose.

Figure 2:
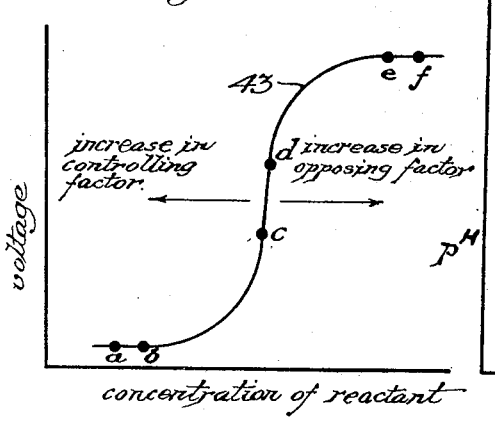
Figures 2 and 3 are curves useful in explaining the invention.
Figure 3:
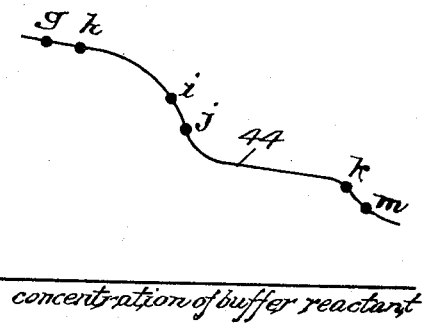
Figure 6:
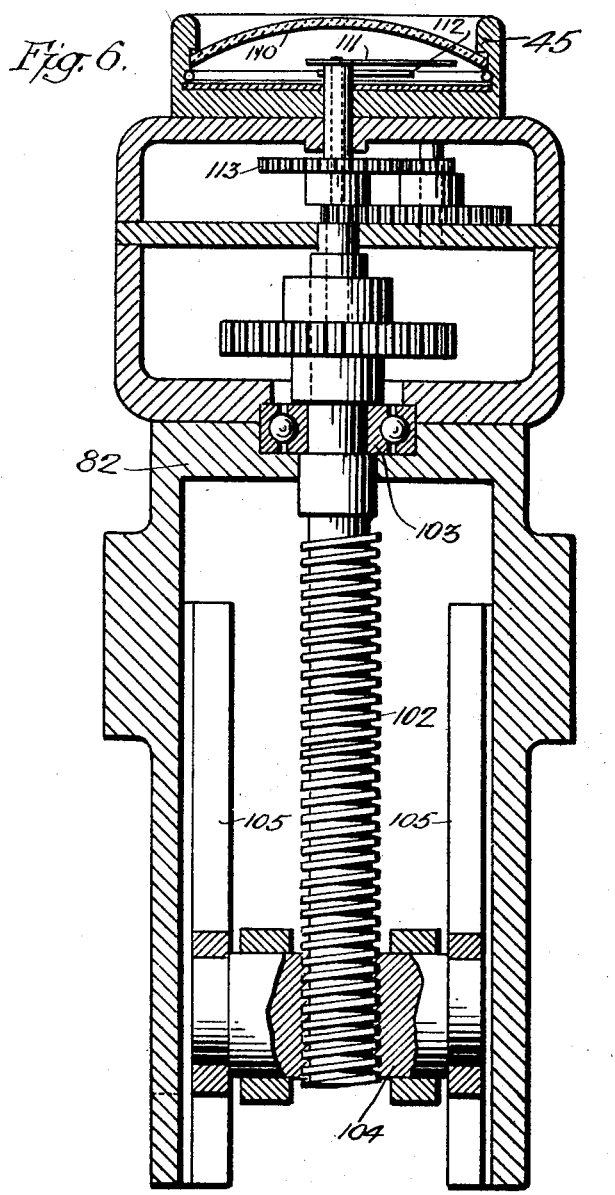
Figure 6 is a section of Figure 5 on the line 6—6 to further enlarged scale.

As best seen in Figure 2, a typical titration curve 43 is shown, using as ordinates the voltage across the sensing element and as abscissae the concentration of the particular reactant present in the main solution. It will be noted that over a particular concentration range $ab$ corresponding to one extreme concentration of the reactant and over another concentration range $ef$ corresponding to an opposite extreme concentration of the reactant, very little difference in voltage results from considerable change in concentration. For example, if hydrogen ion concentration is being controlled the portion $ab$ of the curve might correspond to the condition for a strongly acid solution and the portion $ef$ would therefore correspond to the condition for a strongly basic solution. Neither of these concentrations can be accurately controlled by directly sensing the voltage across the sensing element present in such strong solutions. By the addition of the sample reactant, however, which is of opposite chemical character from the main reactant, the concentration of the titration mixture will move into the range of the portion of the curve $cd$ which corresponds to a much weaker solution than that corresponding to the extremes. At the portion $cd$ of the curve a very considerable voltage change occurs for a small change in concentration and therefore more accurate control can be accomplished.

Where hydrogen ion concentration is being controlled, the sample reactant will preferably be a buffer acid or alkali in sufficient concentration to bring the hydrogen ion concentration in the titrating chamber into a range for accurate control. Thus if the main solution corresponded to the range $gh$ on curve 44 of Figure 3, which plots pH as ordinates against concentration of buffer acid as abscissae, the sample reactant would bring the concentration into the range $ij$ or $km$ at which accurate control could be accomplished. Unbuffered acid such as sulphuric, nitric, hydrobromic or hydrochloric will preferably not be used, where the main solution is also unbuffered, as a variation in addition of sample reactant would cause a very wide variation in the pH. A much more gradual slope of the curve is desired, so that for any given addition of sample reactant within a reasonable tolerance there will be only one characteristic pH, thus accomplishing a very small change in pH for a given small increment of buffer sample reactant. Suitable buffer acids which may be used as sample reactants are phosphoric, acetic, oxalic, citric, tartaric, carbonic and boric acids. Suitable buffer alkalis are trisodium phosphate, sodium carbonate, sodium borate and sodium meta silicate. In general the buffer acids and alkalis are less than 50 percent ionized, and in the great majority of cases are less than 10 percent ionized. In the event that the main body of liquid is sufficiently buffered, a strong acid or alkali may be used without difficulty as the sample reagent.

In order to obtain an indication of the concentration of the main body of liquid, an indicator is provided for the variation in the stroke of the sample reactant pump. In Figure 1 a mechanical indicator 45 is shown, to be described in more detail, as well as an electrical indicator 46 which responds to motion of the stroke control motor 41, as by means of a self-balancing potentiometer or self-synchronous system 47, responding to the motion of motor 41, and wiring 48. It will be understood that position indicators of this character are well known. Each of the indicators 45 and 46, although directly indicating stroke adjustment of the pump 34, in fact indicate concentration of the main body of liquid 21 since the quantity of sample reactant required to titrate to a constant end point is proportional to the concentration of the main body of liquid.

In many cases it is desirable not merely to indicate but also to control the concentration of the main body of liquid. Figure 1ᵃ shows a variation in Figure 1 which aids the control features, omitting all other parts which will be the same as those shown in Figure 1. Connected in parallel with the wiring 48 to the indicator 46 is wiring 50 to a controller 51, which through wiring 52 controls a stroke varying motor 41' of a variable stroke pump 53 suitably of the same character as the sample reactant pump and drive of Figure 1ᵃ, but omitting the pump unit 24. The pump 53 supplies main reactant 54 from a container 55 provided with a stirrer 56 through the pipe 57 to the main body of liquid 21. The controller 51 is set to maintain zero stroke on the pump 53 and therefore supply no main reactant to the main body of liquid when the sample reactant is being pumped at a predetermined rate to titrate the partial sample. Any reduction in the rate of supply of simple reactant as indicated by shortening of the stroke of the sample reactant pump 34 causes the controller 51 to increase the supply of main reactant to the main body of liquid until the stroke of the sample reactant pump returns to the predetermined value, indicating that the concentration of the main reactant is correct. In case of deviation of the stroke of the sample reactant from the predetermined value to increase the stroke, indicating that the sample reactant is stronger than desired, the main reactant pump will remain inactive until the excess strength of the main solution has been eliminated in any suitable manner.

A very simple construction of the duplex pump is shown in Figures 1, 4, 5, 6 and 7. Each pump unit has a piston 58 in a cylinder 60 pivotally connected to one of the cranks 61 of the drive by a connecting rod 62 for pump 24 and 63 for pump 34. Connecting rod 62 is suitably directly connected to the crosshead of the piston, and need not be provided with the elaborate stroke adjustment mechanism of pump unit 34 which is now to be described, although it will be understood that the remote control stroke adjustment can be used on both pumps if desired.

It will be understood that instead of both pumps being 180° out of phase as has been common in duplex pumps in the prior art, the pump units 24 and 34 operate in phase, each having its suction stroke at the same time as the other and its pressure stroke at the same time as the other. Thus any surging which occurs in the titrating chamber due to the pumping action is self-compensating and the tendency which otherwise would exist for the sensing element to hunt due to the change in the concentration of the titration mixture on each pump cycle is eliminated. The pump units will preferably each deliver 10 to 100 strokes per minute and the chamber will preferably retain the effluents of 1 to 2 minutes' pumping.

The metering pumps employed at 24 and 34 and 53 will preferably be of the step valve type as shown in Milton Roy Sheen U. S. Patents 2,363,429 and 2,367,893.

The preferred form of delivery adjustment for the pumps 34 and 53 is that shown in Milton Roy Sheen U. S. Patent application Ser. No. 654,180, filed March 13, 1946, for Stroke Control Mechanism. Any other suitable type of control of delivery by an automatic variable speed control of the pump unit can of course be used.

Figure 7:
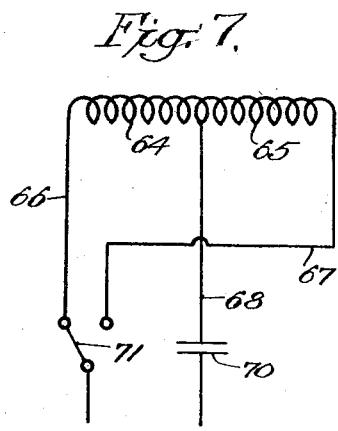
Figure 7 is a circuit diagram showing the duplex pump stroke control motor and its connections.

The controller 38 of well known type causes the stroke adjustment motor 41 to be turned on and off and reversed. A suitable type of motor winding is shown in Figure 7 having opposed coils 64 and 65 connected by end leads 66 and 67 to the electric source through the control mechanism, with a center lead 68 having a series capacitor 70, and with a discriminating switch 71 on the control mechanism which determines when the motor will start or stop and which section of the winding is to be actuated and therefore in which direction the stroke control adjustment motor is to run when started.

It will be understood that this feature is intended to be diagrammatically indicated merely, as it is well known. The drive from the stroke control adjustment motor is through any suitable speed reduction 72 to a sprocket 73 which is on an adjustment shaft 74 having the same axis as the adjustment head later to be described. The sprocket 73 connects with a sprocket 75 on a worm shaft 76 by a chain 77. The speed reduction 72 is in line with a fixed pivot 78 on the frame 80 supported on base 81 and about which adjustment head 82 swings. The adjustment head is driven in its swinging path by an electric motor 83 having a speed reducing unit 84 and cranks 61 which are connected to the opposite duplex pump units. The motor 83 and speed reducer 84 together make up the drive 25. The crank 61 for pump 34 makes pivotal connection at 85 with the connecting rod 63, which is pivotally connected to the adjustment head 82 at 86.

Under the action of this drive, the adjustment head swings back and forth desirably in an invariable path at a frequency which is determined by the speed adjustment of the motor. The linear relation of the adjustment can very conveniently be obtained by regulating the arc through which the adjustment head swings to 60° with as much precision as is necessary, and the arc of swing should then be equal on either side of a line through the fixed pivot 78 of the adjustment head perpendicular to the axis of the pump cylinder as later described.

The pump itself may be of any suitable type having a metering action suitably due to a reciprocating piston and the following is intended to indicate a very desirable form.

The pump essentially comprises a cylinder 60 having a reciprocating piston 58 passing through packing 87 provided with a lubrication opening 88. In this particular form of pump there are desirably multiple inlet check valves 89 and 90 in series with one another and multiple outlet check valves 91 and 92 likewise in series with one another. Inlet is provided at 33 and outlet at 34'. The pump piston is desirably secured to and moved and guided by a crosshead 95 in crosshead guides 96, lubricated at 97, the crosshead being either a part of or an adjunct to the piston as preferred.

The piston is driven by the adjustment head through the interconnection of a link 98 having pivotal connection to the crosshead at 100 and pivotally connecting with the adjustment head at an adjustment pivot 101. The adjustment pivot 101 moves along an adjustment path toward and away from the fixed pivot of the adjustment head in order to control the stroke. This movement is preferably accomplished by an adjustment screw 102 having bearing support at 103 on the adjustment head and threading into a nut 104 which supports the adjustment pivot and is guided suitably in ways 105.

It is very convenient in obtaining the equalized 60° swing of the adjustment head to make the arm of the driving crank 61 equal to the perpendicular distance of the pivot point of the driving link on the adjustment head to the axis of the adjustment screw.

As the adjustment head swings, the worm shaft 76 swings back and forth with it but the sprocket 75 on this shaft maintains its connection with the sprocket 73 on the fixed pivot axis by means of the chain 77.

The interconnection between the worm shaft and the adjustment screw may be accomplished by any suitable gearing, here shown as a worm 106 on the worm shaft and a worm wheel 107 on the adjustment screw.

In order to show the position of the adjustment pivot point, and correspondingly to indicate the concentration of the main body of liquid, an indicator 45 is provided on the top of the adjustment head having a cover glass 110 showing a fast moving hand 111 and a slow moving hand 112 interconnected with the adjustment screw by suitable gearing 113 forming no part of the present invention and described in the aforesaid application of Milton Roy Sheen.

In operation, as the adjustment pivot moves relatively closer to the fixed pivot the stroke of the pump unit is shortened by an amount preferably equal to the distance between the respective adjustment pivot positions.

It will be evident that any other suitable stroke adjustment may be employed in the present invention.

The following are typical illustrations of the service to which the invention may be applied:

Example I

The main body of liquid 21 is a caustic soda process bath in which material is being treated with caustic soda. A continuous sample of two gallons per hour is pumped from the bath 21 by the pump unit 24 to the titration cell. The pump unit 34 on the opposite side of the duplex pump is continuously titrating this caustic soda solution with phosphoric acid solution. The normal strength caustic soda solution is one normal and the strength of the phosphoric acid solution is likewise one normal. When the caustic soda solution is properly up to strength the normalities are equal and therefore the volumes of caustic soda solution and phosphoric acid required to react are equal and the stroke of the pump 34 will equal that of the pump 24, if both pumps have been designed with the same size piston.

Should, however, the strength of the caustic soda solution at 21 drop to 0.5 normal, the length of the stroke of the phosphoric acid pump will automatically be cut down by the controller 38 and stroke control motor 41 to half the previous stroke length, although the end point in the titration cell will remain the same due to the corrective action taken by the controller.

The indicators 45 and 46 will both show that the concentration of the bath 21 is at half strength, and this will desirably be recorded at 46.

Where the controller 51 of Figure 1ª is used, the main body of liquid 21 will never drop to half strength, since the controller 51 will correct this condition by causing the pump 53 to introduce more caustic soda solution, the main reactant, into the main body of liquid 21, as soon as and as long as the stroke of pump unit 34 deviates from the normal value.

*Example II*

In this case an acid spinning bath for production of viscose rayon containing 8 to 10 percent of sulphuric acid together with other ingredients is contained in container 21, and is continuously titrated. The pump unit drawing from the acid bath will feed a partial sample continuously at the rate preferably of two gallons per hour. The pump unit 34 feeds 3 per cent sodium carbonate solution, and the piston size in proportion to pump unit 24 is designed so that the volumes of the partial sample and sample reagent will be as nearly equal as possible when the viscose bath is at required strength. An end point is selected at pH4 where a satisfactory break in the titration curve occurs (if desired the end point may be pH 5 as a satisfactory break is present at that point also). The indicator, by indicating the stroke of the duplex pump unit pumping the sample reagent, indicates and may record the variation in the concentration of the viscose bath.

Using the variation of Figure 1ª, the viscose bath can also be controlled at the desired acid concentration by adding sulphuric acid as the main reagent.

*Example III*

The conductivity of an electroplating bath 21 is indicated, suitably pumping water as the sample reagent, to dilute the electroplating bath to a point at which the conductivity can readily be indicated. Where it is desired to control according to the principles of Figure 1ª, the main reactant is the salt employed, for example sodium sulphate.

*Example IV*

The main solution 21 is a hydrogen peroxide bleach bath. The sample reactant is sodium sulphite (sodium nitrite may also be used). The sensing element is a sensing element for oxidation potential. The indicators record the concentration of the main solution. Where the control of Figure 1ª is used, the main reactant, hydrogen peroxide is added and the main solution is controlled as to concentration.

*Example V*

A strong bleaching solution containing chlorine or sodium hypochlorite at a specified concentration is titrated with sodium sulphite or sodium nitrite and the concentration is determined by the indicators 45 and 46. Where the control of Figure 1ª is employed, the main reactant is chlorine or sodium hypochlorite.

*Example VI*

A strong concentration of calcium peroxide solution is controlled using potassium permanganate as a sample reactant. A dilute solution of sulphuric acid is introduced in proportional quantity, using a triplex pump having the third cylinder to pump the sulphuric acid solution. This can be controlled according to the principles of Figure 1ª by using the calcium peroxide solution as the main reactant.

This same procedure may be employed with other peroxygen compounds besides hydrogen peroxide and calcium peroxide. Suitable other peroxygen compounds are barium peroxide, zinc peroxide, sodium peroxide, sodium perborate, and magnesium peroxide.

*Example VII*

A reducing wash 21 for textile dyeing is continuously titrated using potassium dichromate solution as a sample reactant. For control of the solution according to Figure 1ª, the main reactant is sodium thiosulphate solution.

It will be understood of course that in all of these examples the sensing element will be of a character corresponding to the concentration which is being titrated. Thus where hydrogen ion concentration is being controlled, a hydrogen ion electrode will be employed, where conductivity is being controlled a conductivity cell will be used, and where oxidation potential is being controlled an oxidation potential sensing element will be used.

It will be evident that the invention provides a very simple and convenient mechanism for titrating and controlling the solutions.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a titration system, a container having a main body of liquid whose concentration is being controlled, a duplex metering pump having a first positive displacement pump unit provided with a first pump cylinder, having a plurality of inlet valves connected in series to the first pump cylinder and a plurality of outlet valves in series connected to the first pump cylinder having a second positive displacement pump unit provided with a second pump cylinder, having a plurality of inlet valves in series connected to the second pump cylinder and a plurality of outlet valves connected in series to the second pump cylinder, having a common drive connected to the first and second pump units and having an adjustable linkage between the common drive and the second pump and connecting same adapted to effect a controlled variance in the total displacement, a pipe extending from the container for the main body of liquid to the outermost inlet valve of the first pump unit, the first pump unit diverting a partial sample of liquid from the main body, a container for a sample reagent, a pipe extending from the container for the sample reagent to the outermost inlet valve of the second pump unit, pipes connecting the outermost outlet valves of the first and second pump units together, a concentration sensing element in contact with the combined outputs of the first and second pump units and a controller responsive to the sensing element and controlling the aforesaid adjustment to maintain the sensing element at a constant end point.

2. A titration system according to claim 1, in combination with a container for a main reagent, a pipe extending from the container for the main reagent to the container for the main body of liquid, a main reagent pump in the latter pipe, and a second controller for the main reagent pump responsive to the deviation of the aforesaid adjustment from a particular setting to operate the main reagent pump when such deviation occurs.

3. A titration system according to claim 1, in which the adjustment is an adjustment for the stroke of the second pump unit.

4. A titration system according to claim 1, in which the adjustment varies the stroke of the second pump unit, in combination with a container for a main reagent, a pipe extending from the container for the main reagent to the container for the main body of liquid, a main reagent pump in the latter pipe, and a second controller for the main reagent pump responsive to the deviation of said adjustment from a particular setting to operate the main reagent pump when such deviation occurs.

5. A titration system according to claim 1, in which the suction and pressure strokes of the first and second pump units coincide, so that as the feed of partial sample is momentarily increased the feed of sample reagent is momentarily increased and vice versa, and the tendency of the equipment to hunt is reduced.

ROBERT T. SHEEN.

References Cited in the file of this patent

UNITED STATES PATENTS

| Number | Name | Date |
|---|---|---|
| 1,375,200 | Barnickel | Apr. 19, 1921 |
| 1,684,645 | Smith et al. | Sept. 18, 1928 |
| 2,345,465 | Miles | Mar. 28, 1944 |
| 2,560,317 | Wallace | July 10, 1951 |